United States Patent Office 3,538,088
Patented Nov. 3, 1970

3,538,088
TRIPHENYL TIN COMPOUNDS AS PESTICIDES
Valentin Hartmann, Bonn, Germany, assignor to Ciba Limited, Basel, Switzerland, a company of Switzerland
No Drawing. Filed July 28, 1967, Ser. No. 656,664
Claims priority, application Switzerland, July 28, 1966, 10,964/66
Int. Cl. C07d *103/00;* C07f *7/22*
U.S. Cl. 260—242
4 Claims

ABSTRACT OF THE DISCLOSURE

The present invention relates to preparations for combatting molluscs, especially snails, and larvae of insects, especially of midges, containing as active substance a compound of the general formula

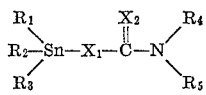

wherein $R_1$, $R_2$ and $R_3$ denote unsubstituted or substituted phenyl radicals, $R_4$ has the meaning of $R_1$–$R_3$ or denotes aliphatic or araliphatic residues, which may be interrupted by oxygen or sulfur, $R_5$ represents a hydrogen atom or has the meaning of $R_4$ or forms together with $R_4$ and the nitrogen atom a heterocyclic ring, $X_1$ and $X_2$ stand for oxygen and/or sulfur, together with suitable carriers or other additives. Some of the active substances of the given formula are claimed.

---

The present invention provides a preparation for combatting molluscs, especially snails, and insect larvae, especially larvae of midges, in open waters or in an area in which the soil is of muddy moist nature, which comprises, as active substance a compound of formula

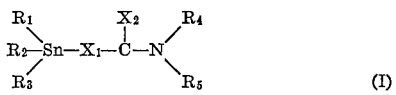

wherein $R_1$, $R_2$, $R_3$ and $R_4$ denote unsubstituted phenyl groups or phenyl groups substituted by halogen atoms, nitrile, nitro, alkyl, alkoxy, alkylthio, trifluoromethyl, thiocyanate or acyl groups and $X_1$ and $X_2$ independently of one another denote oxygen or sulphur atoms, and $R_4$ can furthermore denote an aliphatic or araliphatic group of at most 18 carbon atoms which is saturated or unsaturated and/or interrupted by an oxygen or sulphur atom, with benzyl or phenylethyl groups which are unsubstituted or substituted as specified for $R_1$, $R_2$ and $R_3$, to be especially considered as araliphatic groups, and $R_5$ denotes hydrogen or the definition given for $R_4$, it also being possible for $R_4$ and $R_5$, together with the nitrogen atom bonded to them to form a 5–7-membered heterocyclic ring, especially the pyrrolidine, piperidine, morpholine, piperazine, homopiperazine or cyclohexamethyleneimine residue, together with a carrier.

At the same time it is especially advantageous to use, as active substances, compounds of Formula I wherein $R_1$, $R_2$ and $R_3$ denote unsubstituted phenyl groups or phenyl groups substituted by halogen atoms, alkyl, alkoxy or alkylthio groups having 1–4 carbon atoms and furthermore by nitrile, nitro, trifluoromethyl or thiocyanate groups, $X_1$ and $X_2$ independently of one another denote oxygen or sulphur atoms, $R_4$ denotes a saturated or unsaturated aliphatic group of at most 5 carbon atoms or a phenyl, benzyl or phenyl-ethyl group which is unsubstituted or substituted in the same manner as specified for $R_1$, $R_2$ and $R_3$, and $R_5$ denotes hydrogen or an alkyl group of at most 5 carbon atoms, with $R_4$ and $R_5$ together with the nitrogen atom bonded to them also denoting a 5–7-membered heterocyclic ring, especially the pyrrolidine, piperidine or morpholine ring. Among these, the most important compounds of general Formula I are those wherein $R_1$ denotes an unsubstituted phenyl group or a phenyl group containing, independently of one another, 1–3 substituents selected from among fluorine, chlorine and bromine atoms, and nitrile, nitro, trifluoromethyl and thiocyanate groups, $R_2$ and $R_3$ denote phenyl groups and $X_1$ and $X_2$ independently of one another represent oxygen or sulphur atoms, $R_4$ denotes a saturated or unsaturated aliphatic group having at most 5 carbon atoms or a phenyl, benzyl or phenylethyl group which is unsubstituted or substituted in the same manner as specified for $R_1$, and $R_5$ represents hydrogen or an alkyl group having at most 5 carbon atoms, or $R_4$ and $R_5$ together with the nitrogen atom bonded to them denote a heterocyclic ring, especially the pyrrolidine, piperidine or morpholine ring.

The above-mentioned pests are combatted especially successfully if triphenyl-tin carbamates, thiocarbamates or dithiocarbamates of Formula I are used in which $R_1$, $R_2$ and $R_3$ each denotes the phenyl residue, $X_1$ and $X_2$ independently of one another denote oxygen or sulphur atoms, $R_4$ represents a saturated or unsaturated aliphatic residue having at most 4 carbon atoms or a phenyl or benzyl group which is unsubstituted or substituted by 1–3 chlorine atoms, and $R_5$ represents hydrogen or an alkyl group having at most 3 carbon atoms or $R_4$ and $R_5$ together with the nitrogen atom bonded to them denote the pyrrolidine, piperidine or morpholine ring.

The present invention especially provides preparations containing, as active ingredient, triphenyl tin dithiocarbamates of formula

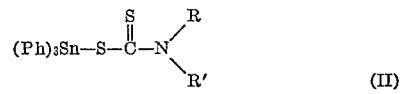

wherein R represents a saturated or unsaturated aliphatic group having at most 3 carbon atoms or a benzyl or phenyl group which is unsubstituted or substituted by 1, 2 or 3 chlorine atoms, and R' represents hydrogen or an alkyl group having at most 2 carbon atoms, or R and R' together with the nitrogen atom bonded to them denote the pyrrolidine, piperidine or morpholine ring.

Thus the above-mentioned preparations are generally those which contain triphenyl tin carbamates, thiocarbamates or dithiocarbamates as active substances and may also contain one or more of the following additives: a wetting agent, a dispersing agent, an emulsifier, an adhesive as well as optionally other known materials for combatting aquatic pests.

The preparations which contain an active component of Formula I or II have a fatal effect on various pests whose ecotope (habitat) is open water or muddy-moist soil consistency.

It has furthermore been found that these preparations which contain the active substances of Formula I or II are particularly fatal to snails, especially snails of the type of Australorbis, Biomphalaria and Bulinus, which are schistosome carriers, for example, *Australorbis glabratus, Biomphalaria pfeifferi* and *Bulinus truncatus.*

It has also been observed that these preparations, which contain the active substances of Formula I or II, have a fatal effect on insect larvae, especially midge larvae, for example, midge larvae of the types which are known as disease carriers, for example, *Aedes aegypti* and *Anopheles maculipennis.*

This fatal effect is not impaired by the presence of such living and/or dead and/or dying animal or vegetable substance or by mineral substances that normally occur in the habitat of such pests, and the abovementioned fatal effect is most appropriately brought about by direct and/or indirect application of suitable mixtures or of the compounds themselves of Formula I or II. The active substances of Formula I or II are in part known. Those that have not yet been described in the literature can be manufactured by methods which are in themselves known, for example, by reaction of triaryl tin halides with carbamates, thiocarbamates or dithiocarbamates or their alkali salts in an inert medium, for example, alcohol, benzene, toluene and the like.

The preparations of the invention, for example, include mixtures for direct use against molluscs and insect larvae. Suitable mixtures for this purpose which may be quoted are, for example, solutions or dispersions which contain the abovementioned carbamates of Formula I or II together with liquid diluents or carriers. Such mixtures can, for example, be used in the form of sprays or foams and can optionally contain additives which are suitable for such types of use, for example, wetting agents and/or dispersing agents.

The preparations for indirect application also comprise mixtures which represent a measure for distributing the active substance in the aqueous habitat of the insect larvae or molluscs, for example, in ponds, lakes, boggy waters, canals, slow rivers or harbours. Such mixtures, for example, comprise solutions or dispersions which contain the active substances of Formula I or II together with water-soluble liquids and, if desired, wetting agents, adhesives and/or emulsifiers or dispersing agents. The preparations of the invention may however also be in the form of tablets, granules, compressed blocks or dispersible powders which contain the abovementioned active substances and optionally surface-active materials, for example, dispersing agents and suspending agents and/or inert diluents for these. The tablets or compressed blocks can also be provided with a suitable coating in order to retard the liberation of the active substance in the aqueous medium. The addition of these mixtures to an aqueous medium results in a more or less uniform distribution of the active substances of Formula I or II throughout the entire medium. Furthermore, these mixtures, for example, comprise solutions or dispersions which contain the active substances of Formula I or Formula II together with water-insoluble liquids, which preferably have a boiling range suitable for tropical application, especially oils, for example, kerosene and toluene or xylene, and, if desired, a surface-active material. If these mixtures, which are lighter than water, are added to aqueous media, the active derivatives are distributed uniformly and rapidly over a large area of the abovementioned media, and the mixtures ultimately mix with the entire mass of the media, which have been treated in this way. The duration and extent of this mixing process inter alia depend on the specific gravity of the individual water-insoluble liquids used or of their mixtures with one another, and this factor must be taken into consideration when selecting the mixtures.

The materials of the invention, which are suitable for use in the moist or aqueous habitat of insect larvae and molluscs, also comprise mixtures which contain the active substances together with absorbent material. Suitable absorbent materials for this purpose are, for example, absorbent solid substances, for example, concrete, alumina, bricks and baked slabs, and absorbent fibrous materials, for example, paper or cloth. These materials can, for example, be saturated and/or impregnated with the active substances by means of conventional processes, for example, by dipping these materials into solutions of the active substances and subsequently drying them, if necessary. When these mixtures are introduced into aqueous media, they gradually release the active substances into the abovementioned medium.

The following substances of Formula I or II may, for example, be quoted as active substances suitable for use in the materials of the invention, with the temperatures being given in degree centigrade:

| $R_1=R_2=R_3$ | $X_1$ | $X_2$ | $R_4$ | $R_5$ | Melting point |
|---|---|---|---|---|---|
| $C_6H_5-$ | S | S | $CH_3-$ | H | 90–92 |
| $C_6H_5-$ | S | S | $C_2H_5-$ | H | 129–131 |
| $C_6H_5-$ | S | S | $C_3H_7-$ | H | 89–90 |
| $C_6H_5-$ | S | S | $CH_2=CH-CH_2-$ | H | 71–74 |
| $C_6H_5-$ | S | S | $CH_3-$ | $CH_3-$ | 130–131 |
| $C_6H_5-$ | S | S | $C_2H_5-$ | $C_2H_5-$ | 115–118 |
| $C_6H_5-$ | S | S | (cyclohexyl-H) | | 160–163 |
| $C_6H_5-$ | S | S | (cyclohexyl-H) | | 145–148 |
| $C_6H_5-$ | S | S | (morpholinyl-H,O) | | 167–169 |
| $C_6H_5-$ | S | S | $-CH_2-C_6H_5$ | H | ---------- |
| $C_6H_5-$ | S | S | $-CH_2-C_6H_4Cl$ | H | ---------- |
| $C_6H_5-$ | S | S | $-C_6H_5$ | H | 97–98 |
| $C_6H_5-$ | S | S | $-C_6H_3Cl_2$ (Cl,Cl) | H | ---------- |
| $C_6H_5-$ | O | O | $CH_3$ | H | ---------- |
| $C_6H_5-$ | O | S | $CH_3$ | H | ---------- |
| $C_6H_5-$ | S | O | $CH_3$ | H | ---------- |
| $C_6H_5-$ | S | O | $CH_3$ | $CH_3$ | ---------- |
| $C_6H_5-$ | O | S | $CH_3$ | $CH_3$ | ---------- |

The preparations of the invention may optionally contain additional substances which are suitable for use together with the active substances, for example, to reinforce and/or assist the effect of these substances. Such adjuvants, for example, comprise known materials for combatting molluscs or insect larvae, such as for example, pentachlorophenol, copper sulphate, insecticides and the like.

Preferred preparations are those in which the active substance is dissolved in an organic solvent, for example, toluene or xylene, in the presence of a wetting agent, for example, a condensation product of octylcresol and 8–10 mols of ethylene oxide, with an amount within the range of from 0.5 to 50% by weight of active substance, preferably 5 to 10 % by weight of active substance, being present. These preparations are above all intended for stagnant water, for example, in ponds, lakes, boggy waters or canals. Other especially valuable mixtures are dispersible powders which contain the active substance in the presence of a wetting agent and a dispersing agent, for example, polyglyceride ricinoleate. These mixture are especially suitable for canals in which there is a degree of movement of water, for example, where pumping stations are present, and for slow-flowing rivers.

The abovementioned preparations may be used directly or indirectly against molluscs and insert larvas. They are preferably used in such ratios that 0.001–2.5 parts by weight of active substance are present per million parts by weight of water in the locations which are to be treated.

The following examples illustrate the invention:

EXAMPLE 1

0.5 g. of triphenyl tin-N,N-dimethyl-dithiocarbamate are dissolved in a mixture of 5 cm³ of acetone and 4 cm³ of dimethylformamide. 0.5 g. of Tween–80, an emulsifier which consists of polyoxyethylene (20)-sorbitane monooleate, are added to this solution. This stock solution can be diluted with water as desired, down to concentrations of 0.001 p.p.m. If sexually mature snails of the type of

*Australorbis glabratus*, having a shell diameter of 15 mm., are exposed to a dilution of 0.1 p.p.m. of the active substance, 100% mortality results within 24 hours.

EXAMPLE 2

2.5 kg. of triphenyl tin-pyrrolidino-dithiocarbamate are dissolved in 150 litres of benzene. 200 g. of a condensation product of octylcresol and 8–10 mols of ethylene oxide are added as a wetting agent. If 200 g. of this solution are added to an experimental basin containing 3000 litres of water, in which snails of the type of *Australorbis glabratus* are kept, 100% mortality results within 24 hours.

EXAMPLE 3

Palm-sized porous alumnia plates are impregnated with a solution of 5 g. of triphenyl tin-N-monophenyl-dithiocarbamate and 50 ml. of acetone and are allowed to dry at a temperature of about 30°, so that each plate contains about 2 g. of active substance. When introduced into static water of 1000 l. capacity, a plate impregnated in this way produces 100% mortality of snails of the type of *Australorbis glabratus, Bulinus truncatus* and others, within 24 hours.

EXAMPLE 4

12.5 kg. of triphenyl tin-N-allyl-dithiocarbamate are dissolved in 200 litres of polyethylene glycol. If 1 litre of this solution is added to 100,000 litres of water, and snails of the type of *Australorbis glabratus* and *Bulinus truncatus* are treated with such a mixture, 100% are killed within 24 hours.

EXAMPLE 5

2.5 kg. of triphenyl tin-N,N-dimethyl-dithiocarbamate are dissolved in 250 litres of toluene. 450 g. of a condensation product of octylcresol and 8–10 mols of ethylene oxide (as a wetting agent) are added to this solution. If this solution is added to 1 million litres of water, and snails of the type of *Biomphalaria pfeifferi* and other types are treated with the resulting mixture 100% are killed within 24 hours.

If the same solution is diluted with 10 million litres of water, midge larvae of the type of *Aedes aegypti* are 100% killed after being in this water for 24 hours.

EXAMPLE 6

100 g. of triphenyl tin-morpholino-dithiocarbamate are sprayed, in a mixer, with a mixture of 0.5 g. of polyglyceride ricinoleate (as a dispersing agent), 0.5 g. of a condensation product of octylcresol and 8–10 mols of ethylene oxide (as a wetting agent) and 1 g. of water. The entire material is mechanically mixed until it is homogeneous and is then dried at 50° C. If 1 g. of this dispersible powder is added to 2000 litres, a mixture is obtained which kills *Australorbis glabratus, Bulinus truncatus* and other snails 100% within 24 hours.

If 1 g. of the dispersible powder is added to 40,000 litres of water in which midge larvae of the type of *Aedes aegypti* are living, 100% of the larvae are killed after 24 hours.

EXAMPLE 7

100 g. of triphenyl tin-N, N-diethyl-dithiocarbamate are worked into a paste with a solution of 4.5 g. of a condensation product of octylcresol and 8–10 mols of ethylene oxide and 5 g. of a polyglyceride ricinoleate in a mixture of 10 cm.³ of ethanol and 40 cm.³ of acetone. The solvent is evaporated, after which the solid mixture is ground and a dispersible powder is obtained. 1 g. of this dispersible powder can be added to 150,000 litres of water in which midge larvae of the type of *Aedes aegypti* are kept. After 24 hours 100% of these larvae are killed.

EXAMPLE 8

100 g. of triphenyl tin-N,-N-dimethyl-dithiocarbamate are worked into a paste with a solution of 5 g. of a condensation product of octylcresol and 8–10 mols of ethylene oxide (as a wetting agent) in 50 cm.³ of acetone. The solvent is allowed to evaporate, after which 20 g. of dried starch are added and the entire material is intimately mixed. A sufficient quantity of 10% strength corn starch paste is then added to the mixture to make a mass suitable for granulation. The mass is pased through a sieve of 1.6 mm. mesh size and is dried to constant weight at 60° C. The dried mass is thereafter passed through a sieve of mesh size 1.06 mm., after which 1 part of magnesium stearate is added, and the mixture is compressed into tablets. If these tablets are introduced into water, the water and the immediate vicinity can be kept free of infestation by snails and insect larvae.

I claim:

1. A compound of the formula

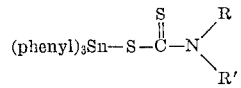

wherein R' is hydrogen and R is phenyl, benzyl or phenylethyl which is substituted in the nucleus by 1–3 halogen atoms, or wherein R and R' together with the nitrogen atom bonded to them represent the pyrrolidine, piperidine, morpholine, piperazine, homopiperazine or cyclohexamethyleneimine residue.

2. The compound triphenyl-tin-N-monoallyl-dithiocarbamate.

3. The compound

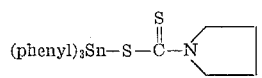

4. The compound

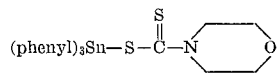

References Cited

UNITED STATES PATENTS

| | | | |
|---|---|---|---|
| 2,187,719 | 1/1940 | Williams. | |
| 2,379,965 | 7/1945 | Hunt | 260—429.7 |
| 2,704,756 | 3/1955 | Leistner et al. | 260—242 |
| 3,248,400 | 4/1966 | Flieg et al. | 260—326.83 |
| 3,412,090 | 11/1968 | Knusli et al. | 260—242 |
| 3,417,117 | 12/1968 | Davis | 260—429.7 |
| 3,422,127 | 1/1969 | Fish | 260—429.7 |

OTHER REFERENCES

Luijten et al.: Investigations in the Field of Organotin Chemistry, index page following p 125, Middlesex, England, Tin Research Institute, 1955.

NATALIE TROUSOF, Primary Examiner

U.S. Cl. X.R.

260—239, 270, 326.83, 429.7; 424—245,288